United States Patent
Kuwabara

(10) Patent No.: US 7,458,720 B2
(45) Date of Patent: Dec. 2, 2008

(54) LINEAR MOTION ROLLING GUIDE UNIT

(75) Inventor: Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 271 days.

(21) Appl. No.: 11/408,736

(22) Filed: Apr. 17, 2006

(65) Prior Publication Data
US 2006/0239595 A1    Oct. 26, 2006

(30) Foreign Application Priority Data
Apr. 22, 2005    (JP) .............................. 2005-124699

(51) Int. Cl.
*F16C 29/06*    (2006.01)
(52) U.S. Cl. .......................................... 384/15; 384/45
(58) Field of Classification Search ............. 384/43–45, 384/15
See application file for complete search history.

(56) References Cited

U.S. PATENT DOCUMENTS

| | | | | |
|---|---|---|---|---|
| 5,087,130 A | * | 2/1992 | Tsukada ....................... | 384/15 |
| 5,209,575 A | * | 5/1993 | Ohtake ......................... | 384/15 |
| 5,342,127 A | * | 8/1994 | Agari ........................... | 384/15 |
| 5,362,155 A | * | 11/1994 | Ichida .......................... | 384/15 |
| 5,464,288 A | * | 11/1995 | Tanaka ......................... | 384/15 |
| 5,553,944 A | * | 9/1996 | Osawa et al. .................. | 384/15 |
| 6,902,322 B2 | * | 6/2005 | Matsumoto .................... | 384/45 |

FOREIGN PATENT DOCUMENTS

JP    3237981    10/2001

* cited by examiner

*Primary Examiner*—Thomas R Hannon
(74) *Attorney, Agent, or Firm*—WolfBlock LLP

(57) ABSTRACT

A linear motion rolling guide unit capable of being adapted to an ultra-reduction in size. A recessed portion 23 is provided in each of the side faces 18 of a track rail R below a lower raceway face 2 and extends parallel to the axis of the track rail R. An underside seal 24 has a seal portion 24*d* facing the recessed portion 23. Engaging hooks 24*c* are provided at the two ends of the underside seal 24. End caps 3, 4 have engaging holes 26 engaging with the respective engaging hooks 24*c*. The underside seals 24 and the end caps 3 and 4 are each formed of a synthetic resin in one piece.

3 Claims, 10 Drawing Sheets

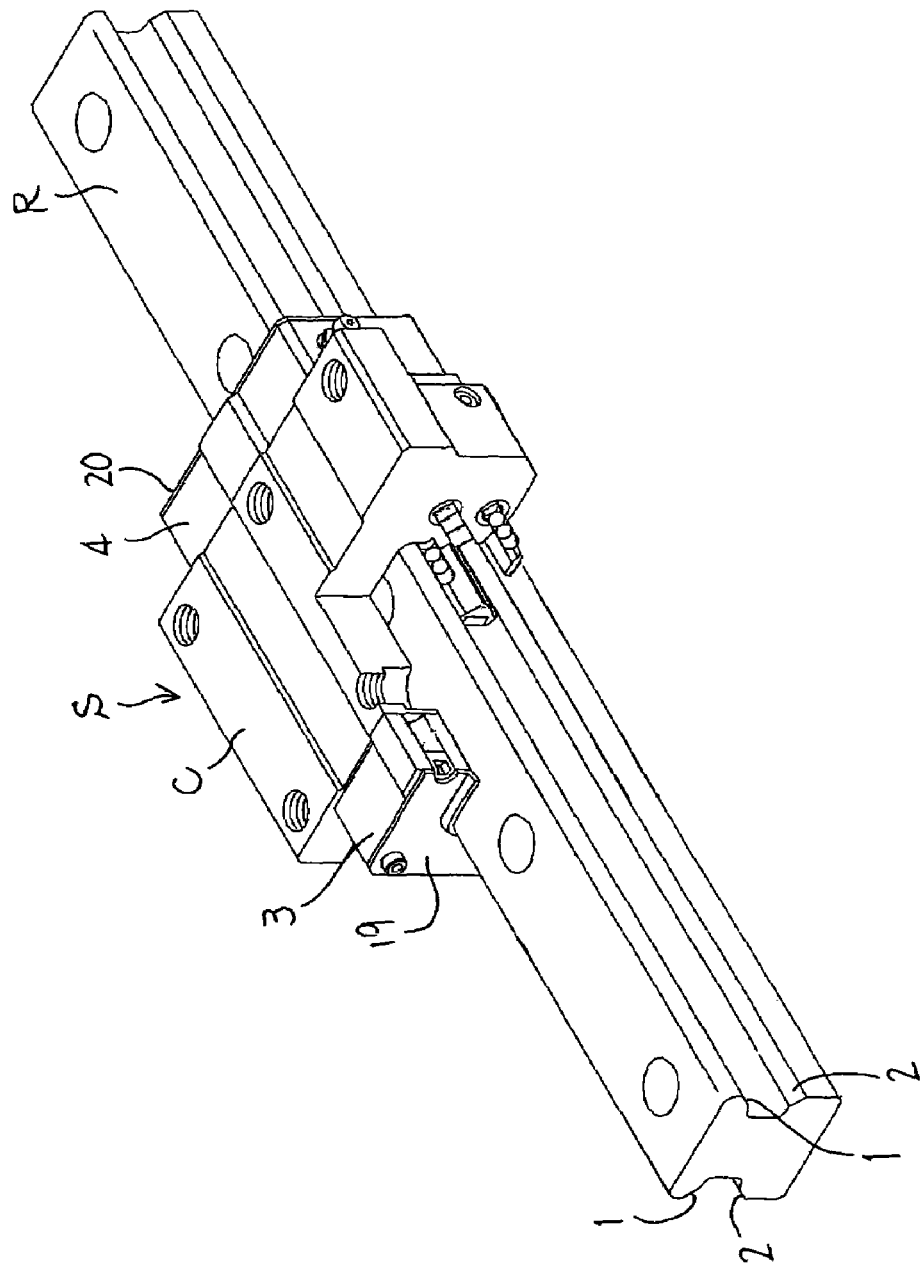
Fig. 8 *Prior Art*

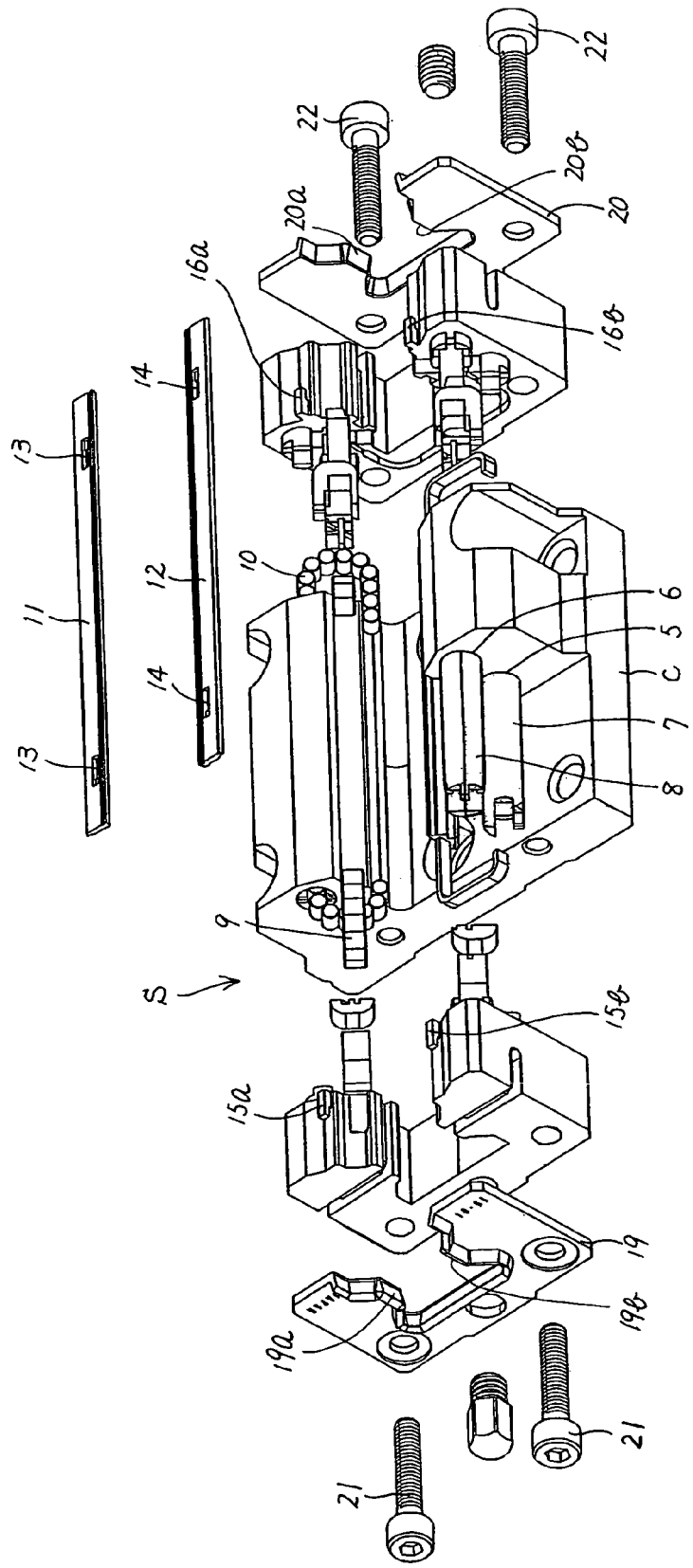
Fig. 9  *Prior Art*

Fig. 10 *Prior Art*
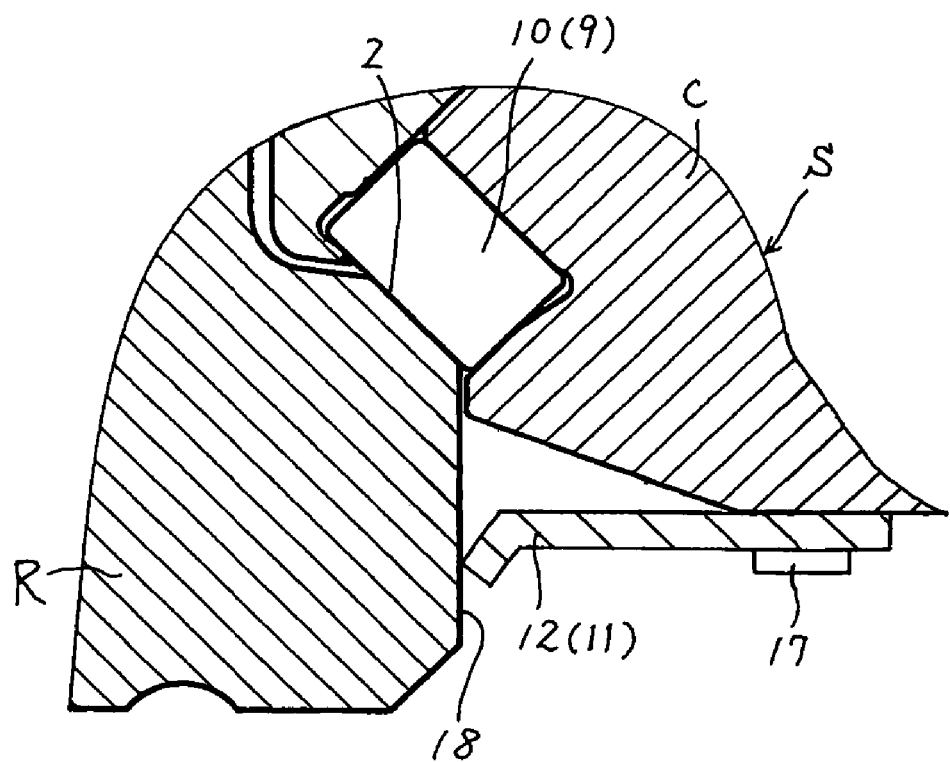

LINEAR MOTION ROLLING GUIDE UNIT

BACKGROUND OF THE INVENTION

1. Field of the Invention

This invention relates to a linear motion rolling guide unit providing guide operation by rolling rollers on raceway faces formed in a track rail, and provided with underside seals for preventing the intrusion of dust to the raceway faces.

2. Description of the Related Art

One of the conventional linear motion rolling units of the type described above is disclosed in Jp. Patent Publication No. 3237981 as illustrated in FIGS. 8 to 10, for example. The conventional guide unit includes two raceway faces 1 and 2 formed on each side face of a track rail R, and a slider S straddling and running on the track rail R having the raceway faces 1 and 2.

The slider S is provided with end caps 3 and 4 respectively combined with the front and back ends of a casing c. The slider S is bilaterally symmetrical with respect to the axis of the track rail R. Therefore, the structural elements having the same shape in bilateral symmetry will be hereinafter described by use of the same reference numerals or symbols.

A pair of guide holes 5 and 6 is formed in the casing c. The guide holes 5 and 6 extend through the casing c in the axis direction parallel to each other in upper and lower positions. Guide cylinders 7 and 8 are respectively inserted into the guide holes 5 and 6.

Each of the guide cylinders 7 and 8 is made up by combining two semicircular cylinder members together. Circular-cylindrical rollers 9 and 10 are incorporated in the guide cylinders 7 and 8 in such a manner as to allow them to roll therein. The circular-cylindrical rollers 9, after rolling in the upper guide cylinder 7, are guided in a direction that brings them into contact with the lower raceway face 2, while the circular-cylindrical rollers 10, after rolling in the lower guide cylinder 8, are guided in a direction that brings them into contact with the upper raceway face 1. The circular-cylindrical rollers 9 and 10 guided in this manner run inside the end cap 3 or 4 while crossing each other without interfering with each other.

Underside seals 11 and 12, each including a cored bar around which a rubber material is wrapped, are secured on the underside of the slider R. Each of the underside seals 11 and 12 has a longer length than the entire length of the casing c so that the two ends of the, underside seal respectively face the end caps 3 and 4 which are provided at the respective ends of the casing c. Long holes 13 and 14 are drilled in portions of the ends of each of the underside seals 11 and 12 in the longitudinal direction thereof.

A pair of hooks 15a, 15b and a pair of hooks 16a, 16b are formed on the respective undersides of the end caps 3 and 4 of the slider S, and fitted into the long holes 13 and 14.

FIG. 10 illustrates the underside seal 11 (12) hooked as described above. As seen from FIG. 10, each of the underside seals 11 and 12 is secured to the casing c with a bolt 17. The leading end (in the sectional view of FIG. 10) of each of the secured underside seals 11 and 12 seals a side face 18 of the track rail R to prevent the intrusion of dust into the area including the lower raceway face 2 and the circular-cylindrical rollers rolling on the lower raceway face 2.

FIGS. 8 and 9 show end seals 19 and 20 and bolts 21 and 22 for securing the end seals 19 and 20 to the end caps 3 and 4. The end seals 19 and 20 have projections 19a and 20a formed on their inner sides. The projections are fitted into the recessed grooves formed between the raceway faces 1 and 2 of the track rail R and can slide thereon.

These days, what is required is a very small-sized guide unit with a track rail about 10 mm wide having raceway faces, but the foregoing conventional guide unit cannot answer this requirement of a reduction in size due to the following reasons.

The reduction in size of the entire guide unit reduces the size of the slider S and end caps 3 and 4 as a natural consequence. However, in the conventional guide unit, the hooks 15a, 15b, 16a and 16b are formed on the end caps 3 and 4. The more the size of the end cap is reduced, the more difficult the formation of the hooks 15a, 15b, 16a and 16b on the end caps 3 and 4 becomes. A first reason for the impossibility of the ultra-reduction in size is that the ultra-reduction in size of the end caps results in the difficulty of forming the hooks 15a, 15b, 16a and 16b.

Even if the hooks 15a, 15b, 16a and 16b can be formed on the end caps 3 and 4, it is difficult to maintain the strength of the hooks. Accordingly, a second reason for the impossibility of the ultra-reduction in size is that the reduction in size of the end caps results in the impossibility of maintaining the strength of the hooks 15a, 15b, 16a and 16b.

Further, the bolts 17 are required to secure the underside seals 11 and 12, because the long holes 13 and 14 and the hooks 15a, 15b, 16a and 16b are by themselves insufficient to provide the force for holding the underside seals to the slider S. However, if the size of the guide unit is reduced, thin and narrow underside seals 11 and 12 must be necessary. To secure the thin and narrow underside seals 11 and 12 with the bolts 17 involves a high degree of difficulty and effort from a workability viewpoint. Accordingly, a third reason for the impossibility of the ultra-reduction in size is the impaired workability for securing the underside seals 11 and 12 with the bolts.

SUMMARY OF THE INVENTION

It is an object of the present invention to provide a linear motion rolling guide unit capable of being adapted to an ultra-reduction in size.

The present invention provides a linear motion rolling guide unit comprising a track rail that has raceway faces, a slider that straddles and runs on the track rail and incorporates endless rolling rows each constituted of a plurality of rolling elements rolling on each of the raceway faces of the track rail, and underside seals that are provided on the underside of the slider for prevention of the intrusion of dust into an area including the raceway faces and the rolling elements rolling on the raceway faces. The types of rolling elements described in the present invention include a circular-cylindrical roller, a long cylindrical roller, a needle roller, a ball and the like.

The linear motion rolling guide unit provided by the present invention is characterized in that a recessed portion is provided in each of the side faces of the track rail below the raceway faces and extends parallel to the axis of the track rail. Further, each of the underside seals is provided with a seal portion facing the recessed portion, and has engaging hooks respectively provided at two ends of the underside seal. In addition, the slider is provided with end caps having engaging holes for engaging with the engaging hooks, and the underside seals and the end caps are each formed of a synthetic resin in one piece.

The linear motion rolling guide unit is characterized in that opposing faces of the recessed portion and the seal portion are formed in an arc shape, and the recessed portion and the seal portion are placed close to, and out of contact with, each other.

The linear motion rolling guide unit is characterized in that each of the underside seals is gradually decreased in thickness from the seal portion close to the raceway face toward a side of the underside seal far away from the raceway face to form a wedge shape in cross section in a direction at right angles to its axis, and one inclined face of the wedge shape is in contact with an inclined face formed on the slider to provide clearance for a grinding wheel, so that the underside seal is positioned either flush with or above the lowermost face of the slider.

According to the present invention, because what is required is for the end cap to have engaging holes for engaging with the engaging hooks of the underside seal, the end cap can be adapted to a reduction to any size, for example.

Further, the recessed portion is provided in parallel to the axis of the track rail and the seal portion facing the recessed portion is provided on the underside seal, so that the recessed portion and the seal portion are overlaid on each other in the vertical direction. As a result, it is hard for dust to enter the lower raceway face located above the recessed portion and the seal portion and the rolling elements rolling on the lower raceway face.

Still further, the need to use bolts or the like to secure the underside seal is eliminated. The underside seal can be attached to the slider simply by fitting the engaging hooks of the underside seal in the engaging holes formed in the end caps, resulting in an improvement of workability for attaching the underside seal to the slider.

According to the present invention, further, because the opposing faces of the recessed portion and the seal portion are' formed in an arc shape, and the recessed portion and the seal portion are placed close to, and out of contact with, each other, the control of dimensions can be simplified even when the guide unit is ultra-reduced in size.

Yet further, the underside seal has a wedge shape in cross section, and one inclined face of the wedge shape is in contact with an inclined face that is formed on the slider for providing clearance for a grinding wheel, so that the underside seal is positioned either flush with or above the lowermost face of the slider. As a result, the underside seal does not project downward from the slider.

BRIEF DESCRIPTION OF THE DRAWINGS

FIG. 8 is a perspective view illustrating a conventional linear motion rolling guide unit with a partial sectional view.

FIG. 9 is a perspective exploded view of a slider of the conventional guide unit.

FIG. 10 is a partially enlarged sectional view illustrating the relative positions of the track rail and the casing in the conventional guide unit.

DETAILED DESCRIPTION OF THE PREFERRED EMBODIMENT

Figure 1:
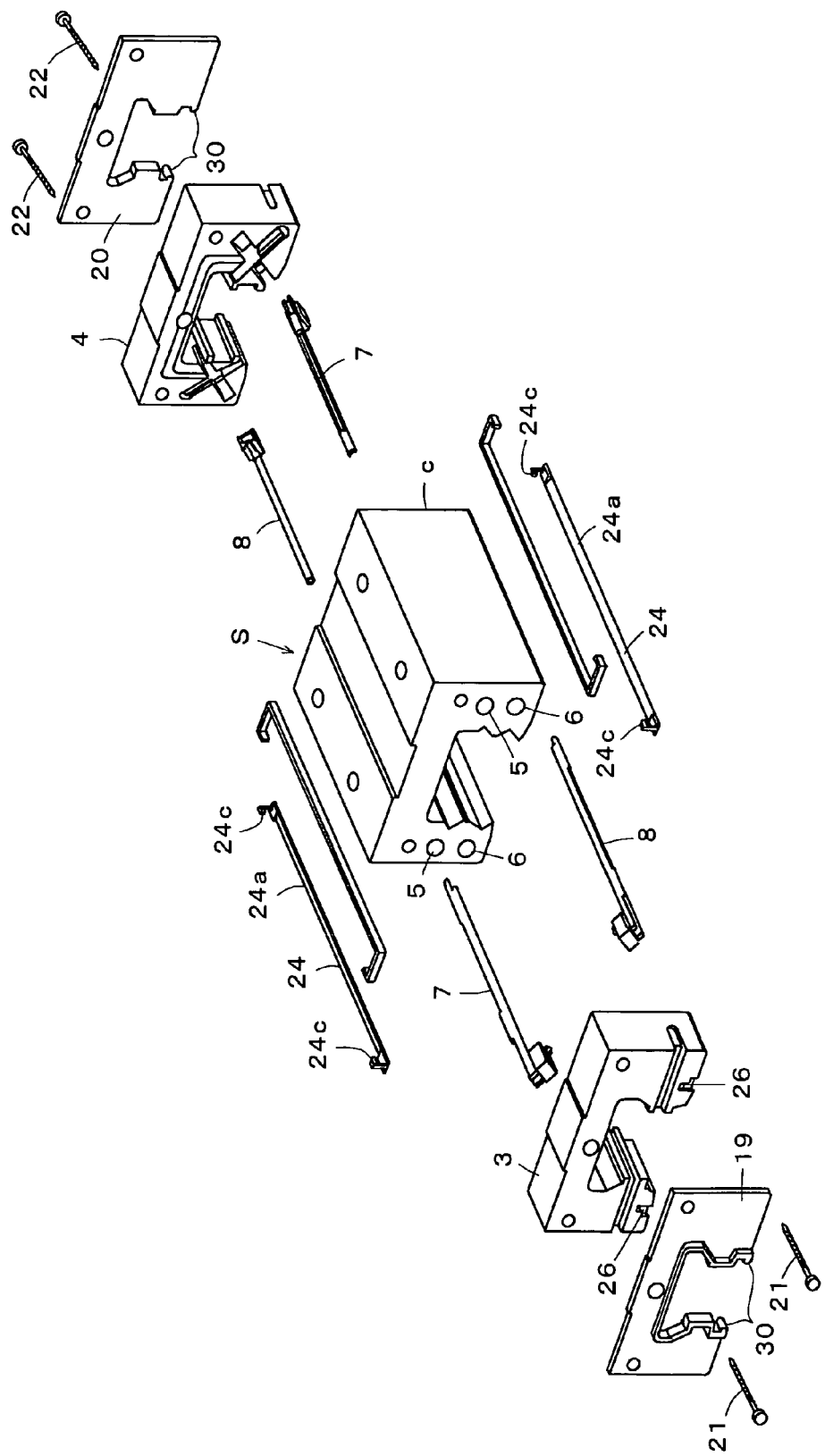
FIG. 1 is a perspective exploded view of a slider according to the present invention.

An embodiment according to the present invention illustrated in FIG. 1 to FIG. 7 differs in the shape of the underside seal, the structure of the mounting of the underside seal and the like from the example of the conventional guide units described earlier. The entire structure including the same structural elements as those in the conventional guide unit is described below, and the same structural elements are indicated with the same reference numerals as those used in the conventional guide unit.

Figure 2:
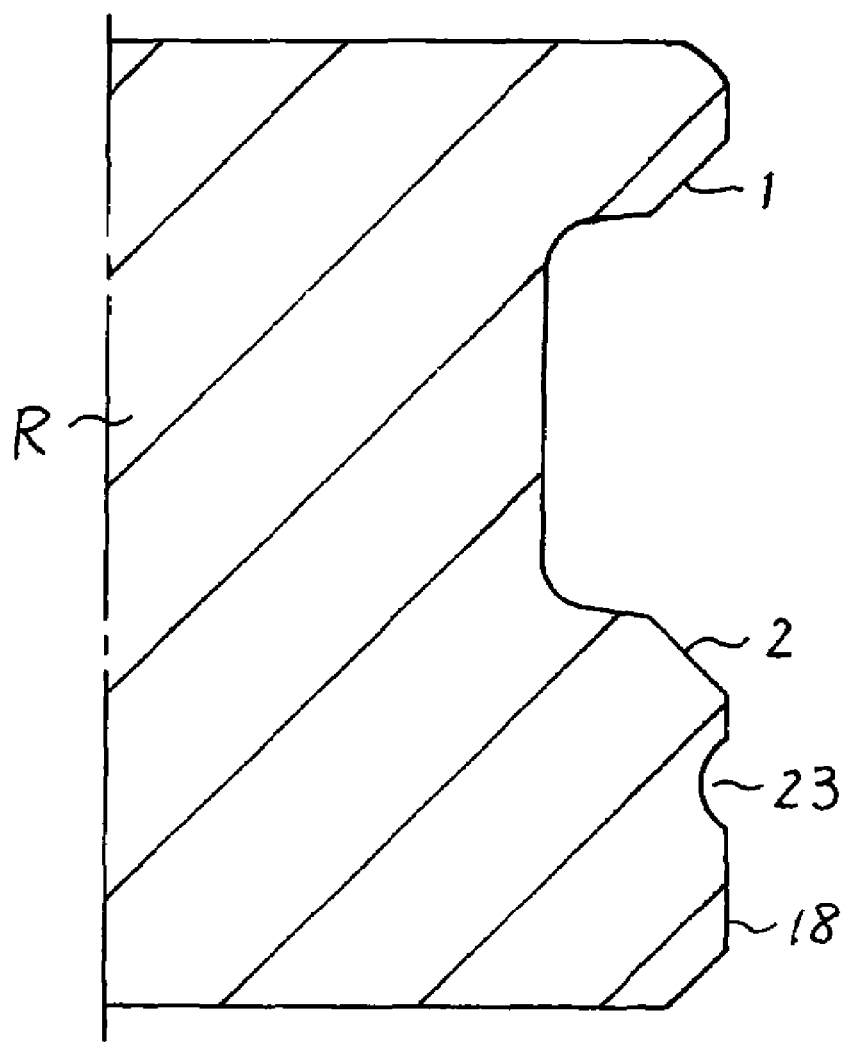
FIG. 2 is a sectional view of one half of the track rail.

As in the case of the conventional guide unit, the guide unit of the embodiment has two raceway faces 1 and 2 formed on each of the two sides of a track rail R having the raceway faces, and a slider S runs on the track rail R having the raceway faces 1 and 2 while straddling it. As illustrated in FIG. 2, the track rail R in the embodiment has an arc-shaped recessed portion 23 formed in a side face 18 located below each lower raceway face 2. The recessed portion 23 extends parallel to the axis of the track rail R.

The slider S includes a casing c and end caps 3 and 4 provided integrally with the respective two ends of the casing c. The slider S is bilaterally symmetrical with respect to the axis of the track rail R. Therefore, the structural elements having the same shape in bilateral symmetry will be hereinafter described by use of the same reference numerals or symbols, and the description given relates to only half of the bilateral symmetry, for the sake of convenience.

A pair of guide holes 5 and 6 extends through the casing c in the axis direction. The guide holes 5 and 6 are parallel to each other in upper and lower positions. Guide cylinders 7 and 8 are inserted into the respective guide holes 5 and 6.

Each of the guide cylinders 7 and 8 is made up by combining two semicircular cylinder members together. Circular-cylindrical rollers 9 and 10 are incorporated in the guide cylinders 7 and 8 in such a manner as to allow them to roll therein. The circular-cylindrical rollers 9, after rolling in the upper guide cylinder 7, are guided in a direction that brings them into contact with the lower raceway face 2, while the circular-cylindrical rollers 10, after rolling in the lower guide cylinder 8, are guided in a direction that brings them into contact with the upper raceway face 1. The circular-cylindrical rollers 9 and 10 guided in this manner run inside the end cap 3 or 4 while crossing each other without interfering with each other.

Figure 3:
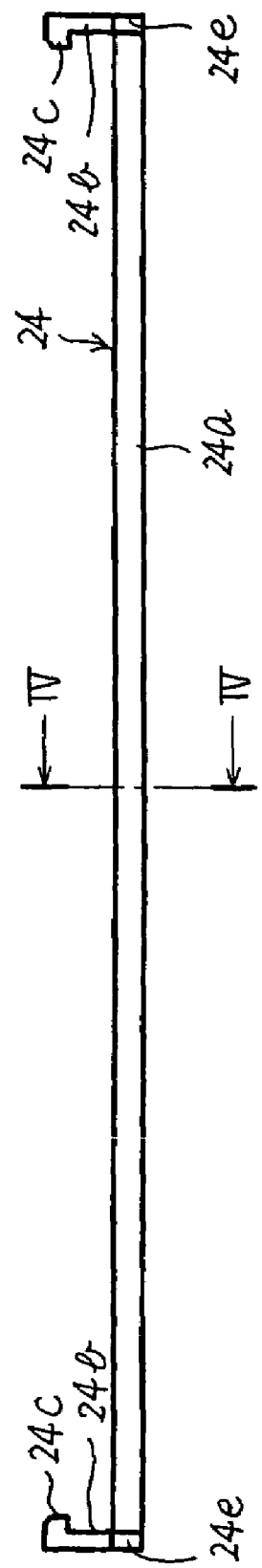
FIG. 3 is a side view of an underside seal.
Figure 4:
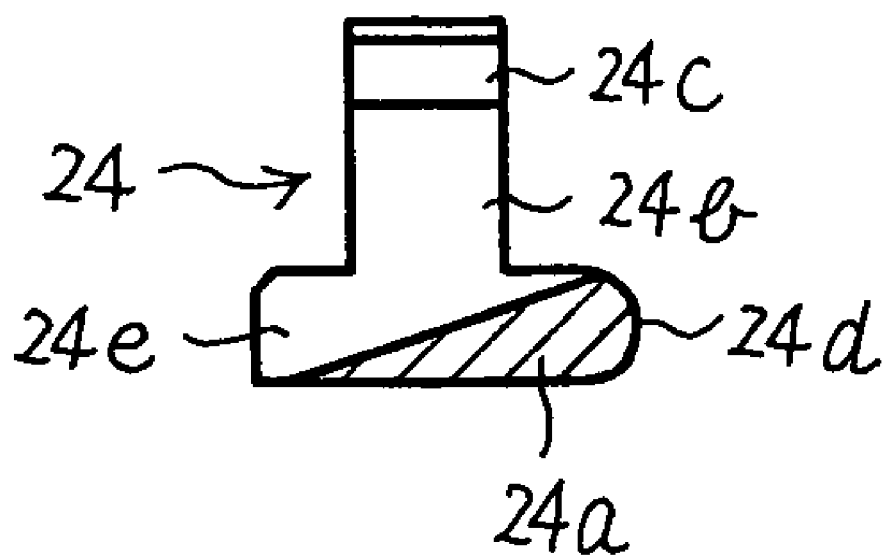
FIG. 4 is a sectional view taken along the IV-IV line in FIG. 3.
Figure 5:
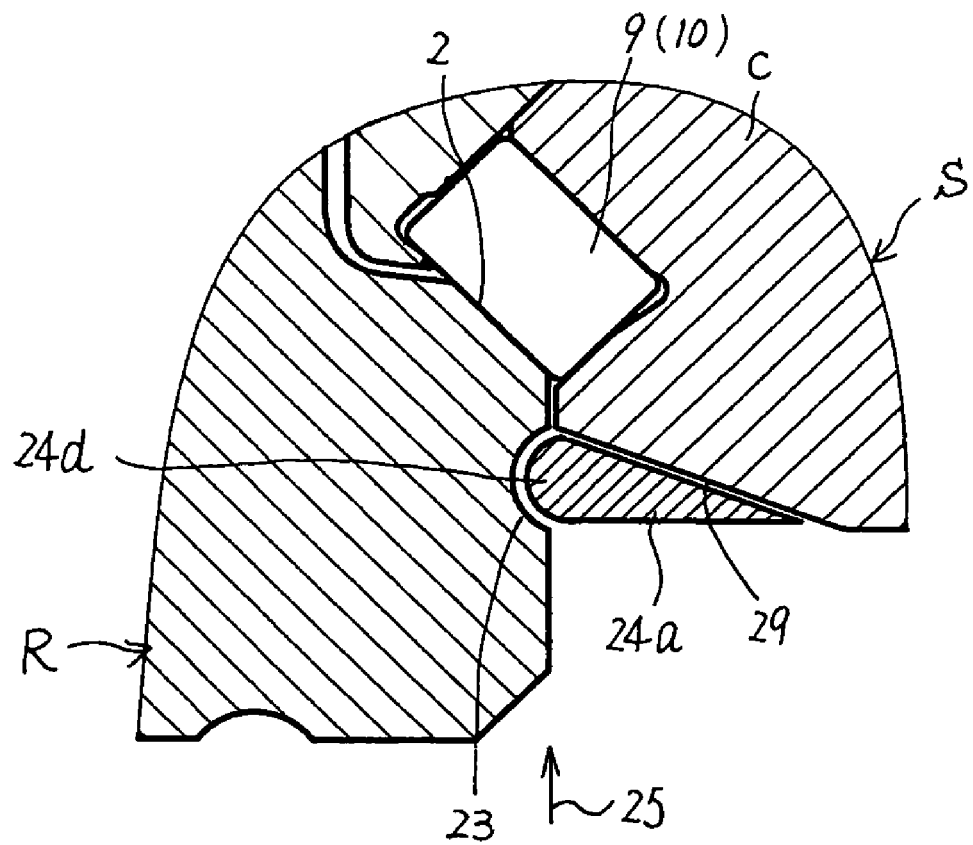
FIG. 5 is a partially enlarged sectional view illustrating the relative positions of the track rail and the casing.
Figure 6:
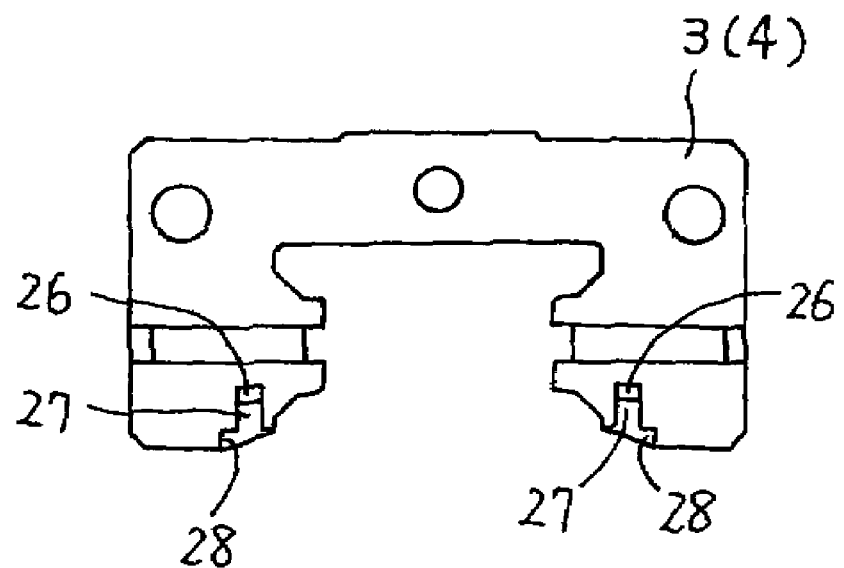
FIG. 6 is a front view of an end cap.
Figure 7:
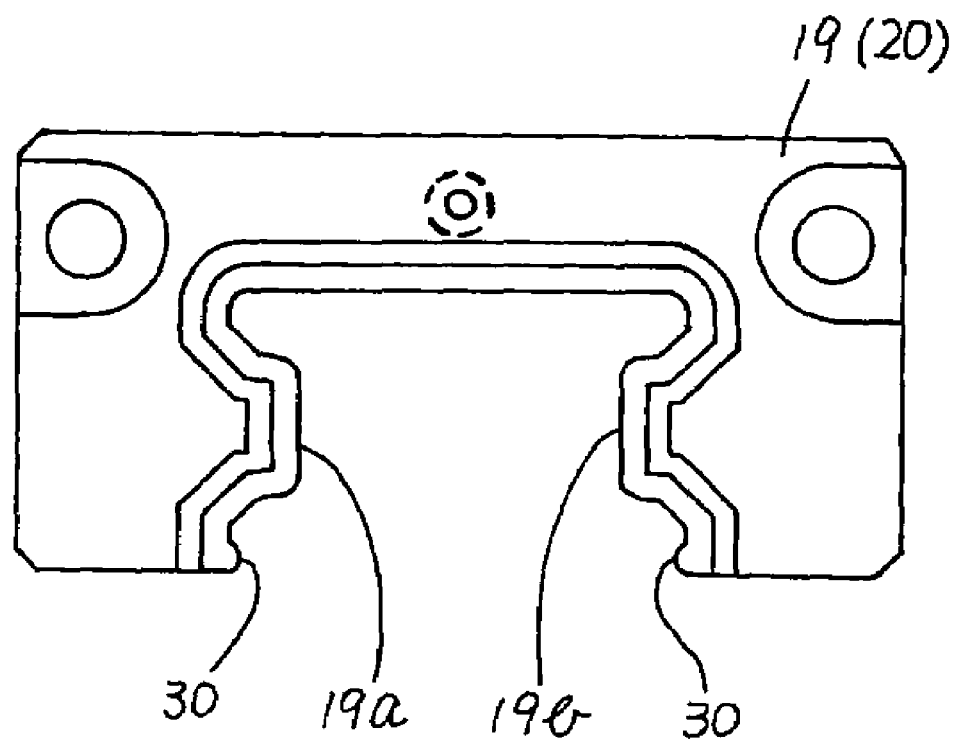
FIG. 7 is a front view of an end seal.

An underside seal 24 as illustrated in FIGS. 3 to 5 is provided on the underside of the slider S. The underside seal 24 includes a plate portion 24a, a projecting portion 24b provided at each of the two ends of the plate portions 24a, and an engaging hook 24c provided at the top end of the projecting portion 24b. The plate portion 24a has a length approximately equal to the total length of the casing c and end caps 3 and 4. As is seen from FIGS. 4 and 5, the thickness of the plate portion 24a decreases from the side facing the side face 18 of the track rail R toward the side away from the side face 18, so that the plate portion 24a has a wedge shape in cross section in a direction at right angles to the axis. The thicker side of the plate portion 24a is formed in an arc shape to form a seal portion 24d. When the slider S straddles the track rail R, the seal portion 24d faces the recessed portion 23 and is located close thereto and out of contact therewith. In other words, the seal portion 24d faces the recessed portion 23 and a slight clearance is kept between them.

Because the seal portion 24d faces the recessed portion 23, the lower raceway face 2 and the rollers 9 rolling on the lower raceway face 2 are completely hidden when viewed from the direction of the arrow 25 shown in FIG. 5. Thus, this makes it difficult for dust to enter the lower raceway face 2 and the rollers 9 rolling on the lower raceway face 2. Because a slight clearance is formed between the seal portion 24d and the recessed portion 23, if, for example, a slight error in the dimensional measurements of the seal portion 24d and/or the recessed portion 23 occurs within the range of the above clearance, this error can be addressed.

As shown in FIG. 4, an insertion portion 24e is formed at each of the two ends of the plate portion 24a, and has an equal thickness in the width direction. In other words, the plate portion 24a has a wedge shape in cross section, whereas the insertion portion 24e is rectangular in cross section.

The projecting portion 24b stands upright on the insertion portion 24e, and the engaging hook 24c is formed on the leading end of the projecting portion 24b. The engaging hook 24c extends out toward the other engaging hook 24c at the opposite end of the plate portion 24a. The underside seal 24 structured in this manner is formed of a synthetic resin in one piece.

The end caps 3 and 4 are attached to the respective ends of the casing c of the slider S. As seen from FIG. 6, an engaging hole 26 engaging with the engaging hook 24c, a groove 27 in which the projecting portion 24b is fitted, and a groove 28 in which the insertion portion 24e is fitted are formed on the outer face of each of the end caps 3 and 4. The engaging hook 24c, the projecting portion 24b and the insertion portion 24e of the underside seal 24 are fitted in the engaging hole 26 and the grooves 27 and 28, thereby being flush with the outer face of the end cap 3 (4) to form a flat surface. Each of the end caps 3 and 4 is formed of a synthetic resin in one piece.

The engaging hook 24c, the projecting portion 24b and the insertion portion 24e are engaged with each of the end caps 3 and 4, whereby as illustrated in FIG. 5, the plate portion 24a comes into close contact with an inclined face 29 which is formed on the casing c for providing clearance for a grinding wheel in the manufacturing process for the casing, and the seal portion 24d faces the recessed portion 23 of the track rail R while the slight clearance is kept between the seal portion 24d and the recessed portion 23 as described earlier. Further, the plate portion 24a is in close contact with the inclined face 29 providing clearance for the grinding wheel, whereby the underside seal 24 is flush with the underside' of the casing c.

Because the seal portion 24d faces the recessed portion 23, the lower raceway face 2 and the circular-cylindrical rollers 9 rolling on the lower raceway face 2 are completely hidden when viewed from the direction of the arrow 25 shown in FIG. 5, resulting in reliable prevention of the intrusion of dust to the area including the lower raceway face 2 and the rollers 9 rolling on the lower raceway face 2.

A projection 30 is formed on each of the plate-shaped end seals 19 and 20 which are respectively provided on the outer sides of the end caps 3 and 4. The projection 30 is tightly fitted in the recessed portion 23 formed in the track rail R. Therefore, the projection 30 serves, in combination with the projections 19a and 19b described earlier, the function of preventing the intrusion of dust from the direction of movement of the slider S.

As a major function of the end seals 19 and 20 in the embodiment, the fixing of the end seals 19 and 20 to the respective end caps 3 and 4 prevents the projecting portion 24b, the engaging hook 24c and the insertion portion 24e of the underside seal 24 from respectively becoming detached from the engaging hole 26 and the grooves 27 and 28. In other words, one of the functions served by the end seals 19 and 20 is to tightly fix the underside seal 24 to the slider S.

In a linear motion rolling guide unit structured as described above, each of the end caps 3, 4 and under seals 24 is formed of a synthetic resin in one piece, and the projecting portions 24b, the engaging hooks 24c and the insertion portions 24e of the underside seals 24 are simply respectively fitted in the engaging holes 26 and the grooves 27 and 28 of the end caps 3 and 4, without the need of, for example, a special stopper such as bolts. Accordingly, as long as the end caps 3, 4 and the underside seals 24 can each be formed in one piece, it is possible to reduce the size of the linear motion rolling guide unit and to simplify the assembling process for the guide unit.

Because the recessed portion 23 of the track rail R and the seal portion 24d of the underside seal 24 are overlaid on each other in the vertical direction, this makes it difficult for dust to enter the lower raceway faces 2 located above the recessed portions 23 and the seal portions 24d and the circular-cylindrical rollers 9 rolling on the lower raceway faces 2. Further, since a slight clearance is formed between the seal portion 24d and the recessed portion 23, if, for example, a slight error in the dimensional measurements of the seal portion 24d and/or the recessed portion 23 occurs within the range of the above clearance, this error can be addressed. Note that the embodiment has described the case where a slight clearance is formed between the recessed portion 23 and the seal portion 24d, but the portions 23 and 24d may be in contact with each other. By forming the recessed portion 23 in an arc shape, the drawing process for manufacturing the track rail can be advantageously performed.

The plate portion 24a of the underside seal 24 is formed in a wedge shape in cross section, and one inclined face of the wedge shape is placed in contact with the inclined face 29 which is formed on the casing c for providing clearance for a grinding wheel, so that the plate portion 24a of the underside seal is flush with the lowermost face of the casing c. As a result, the plate portion 24a of the underside seal 24 does not project downward from the casing c.

What is claimed is:

1. A linear motion rolling guide unit comprising:
a track rail having raceway faces and side faces below the raceway faces;
a slider having rolling rows comprising a plurality of rolling elements on each of the raceway faces of the track rail; underside seals on the underside of the slider, each seal having two ends and comprising a seal portion and engaging hooks at the ends; and end caps comprising engaging holes for the engaging hooks, wherein the slider straddles and runs on the track rail, and
a recessed portion in each of the side faces extending parallel to the axis of the track rail, wherein the seal portion faces the recessed portion, opposing faces of the recessed portion and the seal portion are formed in an arc shape, and the recessed portion and the seal portion are placed close to, and out of contact with, each other.

2. The linear motion rolling guide unit according to claim 1, wherein each of the underside seals comprises a wedge at a right angle to its axis, and the slider comprises an inclined face for providing clearance for a grinding wheel, wherein the wedge and the inclined face are in contact, so that the underside seal is positioned either flush with or above a lowermost face of the slider.

3. The linear motion rolling guide unit according to claim 1, wherein the underside seals, the end caps, or a combination thereof comprise a synthetic resin.

* * * * *